United States Patent
Rowe et al.

(10) Patent No.: US 11,370,340 B2
(45) Date of Patent: Jun. 28, 2022

(54) SYSTEMS AND METHODS FOR ACTUATING PILLOWS INCLUDING ACTUATING MUSCLES

(71) Applicant: Toyota Motor Engineering & Manufacturing North America, Inc., Piano, TX (US)

(72) Inventors: Michael P. Rowe, Pinckney, MI (US); Ryohei Tsuruta, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/931,569

(22) Filed: Jul. 17, 2020

(65) Prior Publication Data

US 2022/0017005 A1 Jan. 20, 2022

(51) Int. Cl.
*B60N 2/865* (2018.01)
*B60N 2/879* (2018.01)
(Continued)

(52) U.S. Cl.
CPC ............. *B60N 2/865* (2018.02); *B60N 2/879* (2018.02); *B60N 2/885* (2018.02); *B60N 2/2851* (2013.01);
(Continued)

(58) Field of Classification Search
CPC ........ B60N 2/865; B60N 2/879; B60N 2/885; B60N 2002/899; B60N 2002/924; B60N 2/2851

See application file for complete search history.

(56) References Cited

U.S. PATENT DOCUMENTS 7,523,608 B2 * 4/2009 Shapiro .................. F04B 35/04
60/326
7,679,261 B2 3/2010 Chappaz et al.
(Continued)

FOREIGN PATENT DOCUMENTS

CN 2387816 Y 7/2000
CN 204105587 U 1/2015
(Continued)

OTHER PUBLICATIONS

Shane Mitchell, et al., "An Easy-To-Implement Toolkit To Create Versatile and High-Performance HASEL Actuators for Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.
(Continued)

*Primary Examiner* — Philip F Gabler
(74) *Attorney, Agent, or Firm* — Dinsmore & Shohl LLP

(57) ABSTRACT

An actuating pillow includes a pillow body and a plurality of artificial muscles arranged within the pillow body. Each of the artificial muscles includes a housing having an electrode region and an adjacent expandable fluid region, an electrode pair positioned in the electrode region of the housing, and a dielectric fluid housed within the housing. The plurality of artificial muscles are configured to actuate from a non-actuated state to an actuated state, actuation from the non-actuated state to the actuated state directs the dielectric fluid into the expandable fluid region and increases a height of the pillow body.

20 Claims, 7 Drawing Sheets

(51) Int. Cl.
  *B60N 2/885* (2018.01)
  *B60N 2/28* (2006.01)
  *B60N 2/80* (2018.01)
  *B60N 2/90* (2018.01)
(52) U.S. Cl.
  CPC .. *B60N 2002/899* (2018.02); *B60N 2002/924* (2018.02)

(56) References Cited

U.S. PATENT DOCUMENTS

| | | | |
|---|---|---|---|
| 7,834,527 B2* | 11/2010 | Alvarez Icaza Rivera | H01L 41/0478 310/344 |
| 9,481,466 B2* | 11/2016 | Fischer | B64D 11/064 |
| 9,527,421 B2* | 12/2016 | Hulway | B60N 2/99 |
| 9,748,867 B2* | 8/2017 | Hawes | H02N 1/004 |
| 9,806,639 B2* | 10/2017 | Chen | H02N 1/002 |
| 9,937,830 B1* | 4/2018 | Curry, V | B60N 2/879 |
| 10,086,720 B2* | 10/2018 | Dankbaar | B60N 2/0244 |
| 10,118,514 B2* | 11/2018 | Obadia | B60N 2/0244 |
| 10,233,910 B2 | 3/2019 | Mazzeo et al. | |
| 10,631,083 B1* | 4/2020 | Gandhi | H04R 1/025 |
| 10,640,033 B1* | 5/2020 | Gandhi | F21S 41/285 |
| 10,859,101 B2* | 12/2020 | Rowe | F15B 15/10 |
| 10,933,974 B2* | 3/2021 | Tsuruta | B64C 3/38 |
| 10,960,793 B2* | 3/2021 | Gandhi | B60N 2/42727 |
| 10,995,779 B2* | 5/2021 | Keplinger | F15B 21/06 |
| 11,041,576 B2* | 6/2021 | Gandhi | F16K 31/404 |
| 11,066,016 B2* | 7/2021 | Gandhi | B60R 1/12 |
| 2015/0196131 A1* | 7/2015 | Dacosta-Mallet | A47C 27/083 297/452.41 |
| 2019/0032684 A1* | 1/2019 | Kowalewski | F15B 15/10 |
| 2020/0032822 A1* | 1/2020 | Keplinger | F15B 21/06 |
| 2020/0130202 A1* | 4/2020 | Gandhi | B62D 57/02 |
| 2020/0238854 A1* | 7/2020 | Gandhi | B60N 2/99 |
| 2020/0247274 A1* | 8/2020 | Gandhi | B60N 2/0244 |
| 2020/0298732 A1* | 9/2020 | Gandhi | B60N 2/0248 |

FOREIGN PATENT DOCUMENTS

| | | |
|---|---|---|
| CN | 106136752 A | 11/2016 |
| CN | 206433845 U | 8/2017 |
| CN | 206596898 U | 10/2017 |
| CN | 208598041 U | 3/2019 |
| CN | 209812321 U | 12/2019 |
| JP | 2007097292 A | 4/2007 |
| WO | 2019002860 A1 | 1/2019 |
| WO | 2019173227 A1 | 9/2019 |

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

* cited by examiner

SYSTEMS AND METHODS FOR ACTUATING PILLOWS INCLUDING ACTUATING MUSCLES

TECHNICAL FIELD

The present specification generally relates to apparatus and methods for inflating a pillow, and, more specifically, apparatus and methods for utilizing a plurality of actuating muscles including an electrode pair to direct a fluid to inflate the pillow.

BACKGROUND

An infant's skull bones do not fully fuse and harden for several months after birth. Thus, infants may be prone to deforming their head resulting in a flat spot when lying or sleeping in the same position for excessive periods of time. Flat head syndrome, or plagiocephaly, occurs when a flat spot develops on the back or side of the infant's head. To reduce the risk of this occurring, infants should avoid being put to bed in the same position every night. This is especially important during the first four months after birth before infants are capable of rolling over on their own.

Pillow technology attempts to address this issue to reduce the risk of flat head syndrome in infants by developing pillows that conform to an infant's head and prevent flat spots from forming. These pillows may include mechanisms for adjusting the contour of the pillow, such as air pumps to fill the pillow with air. However, these pillows do not take into account a position of a head of the infant and the devices for adjusting the pillow do not provide sufficient force for adjusting the position of the head.

Accordingly, a need exists for improved pillows that take into account a position of the head of the user and utilize artificial muscles having increased actuator power per unit volume.

SUMMARY

In one embodiment, an actuating pillow includes a pillow body and a plurality of artificial muscles arranged within the pillow body. Each of the plurality of artificial muscles includes a housing having an electrode region and an adjacent expandable fluid region, an electrode pair positioned in the electrode region of the housing, and a dielectric fluid housed within the housing. The plurality of artificial muscles are configured to actuate from a non-actuated state to an actuated state, actuation from the non-actuated state to the actuated state directs the dielectric fluid into the expandable fluid region and increases a height of the pillow body.

In another embodiment, a vehicle seat system including a vehicle seat including a head portion having a forward-facing surface, a pillow body coupled to the forward-facing surface of the head portion of the vehicle seat, and a plurality of artificial muscles arranged within the pillow body. Each of the plurality of artificial muscles includes a housing having an electrode region and an adjacent expandable fluid region, an electrode pair positioned in the electrode region of the housing, and a dielectric fluid housed within the housing. The actuating pillow includes a processor and a non-transitory computer-readable medium storing computer-readable instructions that, when executed by the processor, causes the processor to determine a position of a force on the pillow body, determine a length of time the force is present, and, when the length of time the force is present exceeds an actuation threshold, actuate the electrode pair of at least one of the plurality of artificial muscles from a non-actuated state to an actuated state, and actuate at least one of the plurality of artificial muscles from the actuated state to the non-actuated state. Actuation from the non-actuated state to the actuated state directs the dielectric fluid into the expandable fluid region.

In yet another embodiment, a method for actuating an actuating pillow includes generating a voltage using a power supply electrically coupled to an actuating pillow. The actuating pillow includes a pillow body and a plurality of artificial muscles arranged within the pillow body. Each of the plurality of artificial muscles includes a housing including an electrode region and an adjacent expandable fluid region, an electrode pair positioned in the electrode region of the housing, and a dielectric fluid housed within the housing. A position of a force on the pillow body is determined, a length of time the force is present is determined, when the length of time exceeds an actuation threshold, the voltage is applied to the electrode pair of at least one artificial muscle of the plurality of artificial muscles to actuate the at least one artificial muscle from a non-actuated state to an actuated state, and when the length of time exceeds the actuation threshold, the voltage is discontinued to a different electrode pair of at least one artificial muscle of the plurality of artificial muscles to actuate the at least one artificial muscle from the non-actuated state to the actuated state when the length of time exceeds a predetermined threshold. Actuating the electrode pair of the plurality of artificial muscles from the non-actuated state to the actuated state directs the dielectric fluid into the expandable fluid region of the housing expanding the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
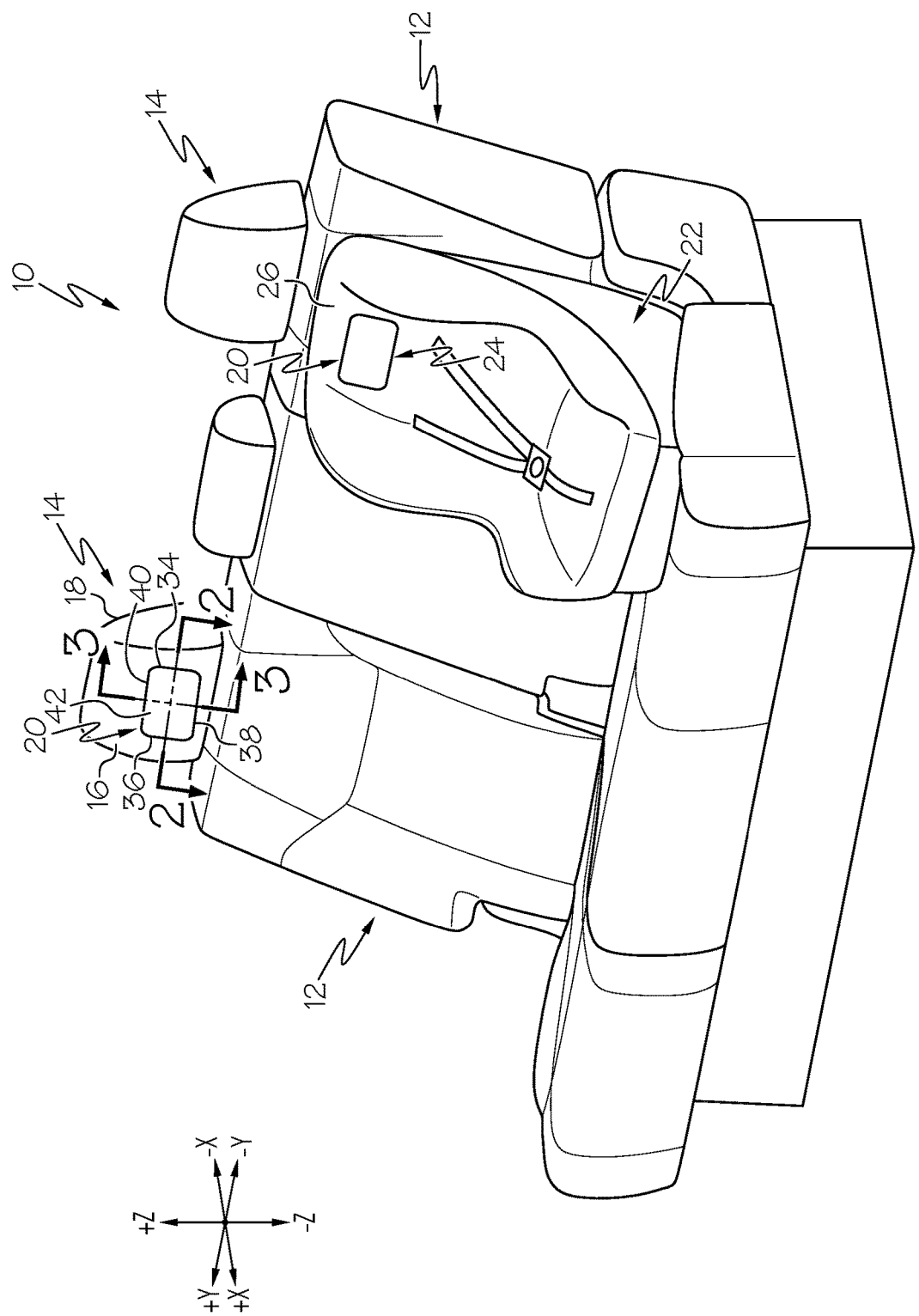
FIG. 1 schematically depicts an interior of a vehicle including an illustrative actuating pillow incorporated into a rear seat and an illustrative actuating pillow incorporated into a child seat, according to one or more embodiments shown and described herein.

Embodiments described herein are directed to actuating pillows including artificial muscles for determining a position of a force, such as a head of a user, and actuating the artificial muscles to reposition the head of the user if the force remains unchanged for a predetermined period of time. Determining whether the force remains unchanged is determined by identifying whether a change or reduction in the amount of the force exceeds a reset pressure threshold and identifying whether a length of time in which the change is experienced exceeds a reset time threshold. The artificial muscles described herein are actuatable to selectively raise and lower a region of the artificial muscles to provide a selective, on demand inflated expandable fluid region within the actuating pillow. The artificial muscles include a housing and an electrode pair. A dielectric fluid is housed within the housing, and the housing includes an electrode region and an expandable fluid region, where the electrode pair is positioned in the electrode region. The electrode pair includes a first electrode fixed to a first surface of the housing and a second electrode fixed to a second surface of the housing. The electrode pair is actuatable between a non-actuated state and an actuated state such that actuation from the non-actuated state to the actuated state directs the dielectric fluid into the expandable fluid region. This expands the expandable fluid region, raising a portion of the artificial muscle and, thus, the pillow on demand. Various embodiments of the artificial muscle and the operation of the artificial muscle are described in more detail herein. Whenever possible, the same reference numerals will be used throughout the drawings to refer to the same or like parts.

Referring now to FIG. 1, a row of seats 10, such as those in a vehicle, including a pair of seats 12 is shown. Each seat 12 includes a headrest 14 having a forward-facing surface 16, against which a head of a user rests, and a rearward-facing surface 18. As a non-limiting example, an actuating pillow 20, as described in more detail herein, may be incorporated into the headrest 14 of at least one of the seats 12. The pillow 20 may be sewn or otherwise attached to the forward-facing surface 16 of the headrest 14 of the seat 12 or, alternatively, the pillow 20 may be provided within the headrest 14 of the seat 12 itself between the forward-facing surface 16 and the rearward-facing surface 18. In embodiments in which the pillow 20 is provided between the forward-facing surface 16 and the rearward-facing surface 18, the pillow 20 may be secured to the forward-facing surface 16 of the headrest 14 to maintain its position within the headrest 14 of the seat 12. As shown, in another non-limiting example, a child seat 22 may be positioned on one of the seats 12 of the row of seats 10 and include the pillow 20. In some embodiments, the pillow 20 may be provided proximate an upper portion 24 of the child seat 22 by either being sewn or otherwise secured to a forward-facing surface 26 of the child seat 22 or, alternatively, may be provided within the child seat 22 proximate the upper portion 24 thereof. In embodiments in which the pillow 20 is provided within the child seat 22, the pillow 20 may be secured to the forward-facing surface 26 of the child seat 22 to maintain its position relative to the upper portion 24 of the child seat 22. Although the pillow 20 is illustrated as being provided on or within the headrest 14 of one seat 12 of the row of seats 10, the row of seats 10 may include a pillow 20 provided on or within the headrest 14 of each seat 12, as well as any other seat of a vehicle. It should be appreciated that the pillow 20 being provided on or incorporated within the headrest 14 of the seat 12 or the child seat 22 is shown for illustrative purposes only and the scope of the present disclosure is not limited to these examples. As such, the pillow 20 may be provided on or within any other suitable surface or against which a user is likely to rest his or her head.

Figure 2:
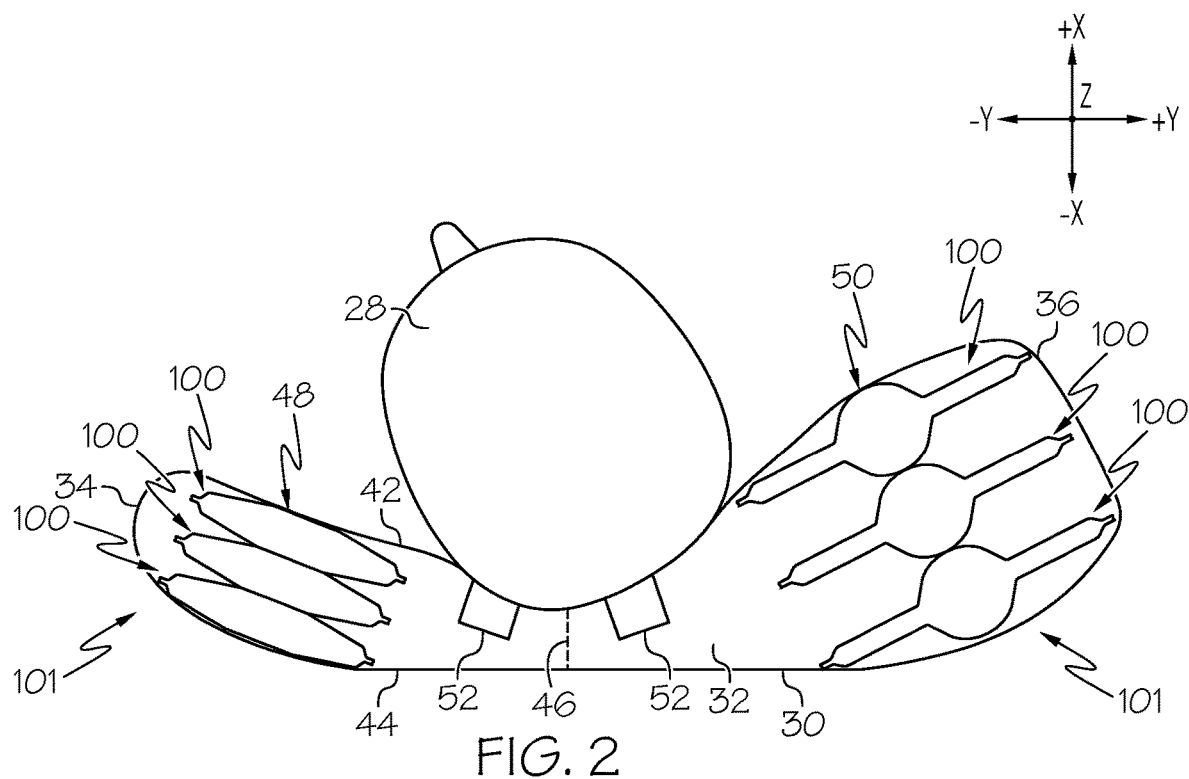
FIG. 2 schematically depicts a cross-sectional view of the actuating pillow of FIG. 1 including a plurality of artificial muscles taken along line 2-2 in FIG. 1, according to one or more embodiments shown and described herein.
Figure 3:
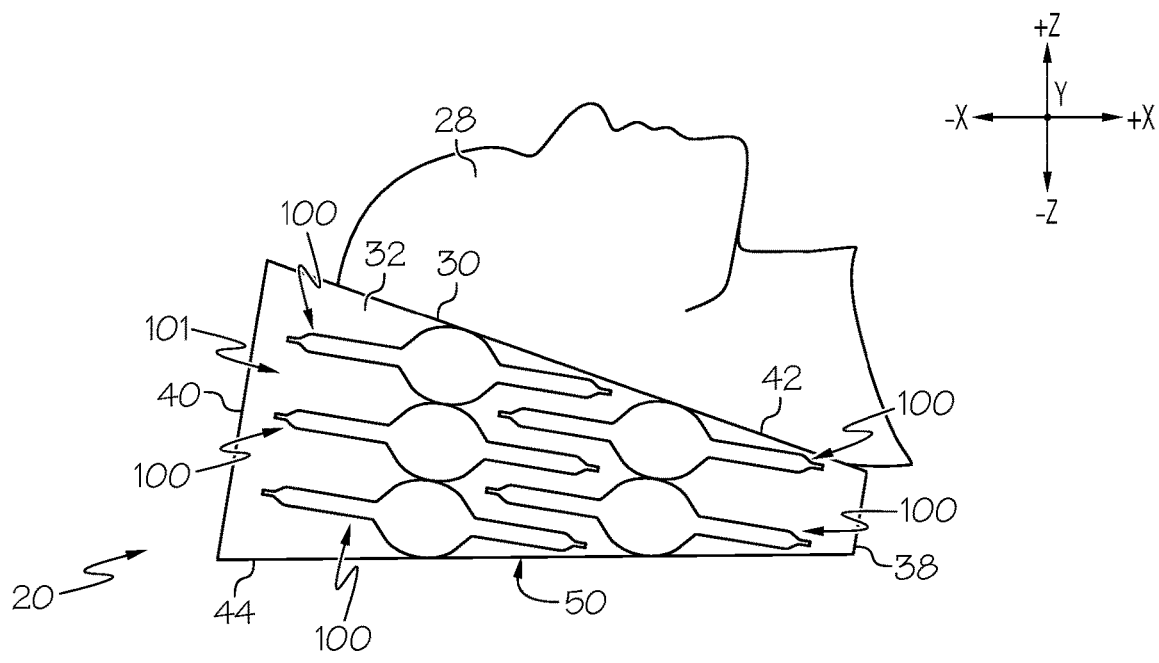
FIG. 3 schematically depicts a cross-sectional view of the actuating pillow of FIG. 1 taken along line 3-3 in FIG. 1, according to one or more embodiments shown and described herein.

Referring to FIGS. 2 and 3, the pillow 20 is shown separate from the seat 12 and child seat 22 and is shown supporting a head 28 of a user. In some embodiments, the pillow 20 has a casing 30 and a pillow body 32 provided within the casing 30. The pillow body 32 may be formed from any suitable cushion material such as, for example, foam, down, feathers, polyester, or the like. As such, the shape or geometry of the pillow 20 is defined by the shape of the pillow body 32. Thus, the pillow 20 may have any suitable geometry, such as square, rectangular, round, or the like, and may be tapered toward an end of the pillow 20 based on the shape of the pillow body 32. In some embodiments, the pillow 20 may include a plurality of individual pillow bodies 32 arranged together within the casing 30 to form the pillow 20.

As shown in FIGS. 2 and 3, the pillow body 32 has a first side end 34, an opposite second side end 36, a front end 38, an opposite rear end 40, an front surface 42, and an opposite rear surface 44. As shown in use, the head 28 of the user is positioned against the front surface 42 of the pillow body 32 at a center 46 of the pillow body 32. The center 46 of the pillow body 32 separates the pillow body 32 into a first side portion 48 provided on one side of the center 46 proximate the first side end 34, and a second side portion 50 provided on an opposite side of the center 46 proximate the second side end 36. As shown in FIG. 3, in some embodiments, the pillow body 32 includes a tapered geometry such that a height of the pillow body 32 is greater proximate the rear end 40 of the pillow body 32 as compared to a height of the pillow body 32 proximate the front end 38 of the pillow body 32. However, it should be appreciated that the pillow body 32 is not limited to this geometry and other embodiments of the pillow body 32 may include, a greater taper, a lesser taper, multiple tapers or contours, or no taper between the rear end 40 and the front end 38 of the pillow body 32. Similarly, although not shown, the pillow body 32 may have at least one taper or contour extending between the first side end 34 and the second side end 36.

Referring still to FIGS. 2 and 3, the pillow 20 includes two or more artificial muscles 100 provided within the pillow body 32 for actuating the pillow 20 and inflating the first side portion 48 and the second side portion 50 of the pillow body 32. Specifically, the pillow 20 includes at least one artificial muscle 100 provided within the first side portion 48 of the pillow body 32 for inflating and deflating the first side portion 48, and at least one artificial muscle 100 provided within the opposite second side portion 50 of the pillow body 32 for inflating and deflating the second side portion 50. In some embodiments, a plurality of artificial muscles 100 may be arranged in any suitable configuration within each of the first side portion 48 and the second side portion 50. In this embodiment, the artificial muscles 100 in the first side portion 48 of the pillow body 32 may be electrically connected to one another to define an artificial muscle assembly 101 and the artificial muscles 100 in the second side portion 50 of the pillow body 32 may be electrically connected to one another to define another artificial muscle assembly 101. In some embodiments, each of the artificial muscle assemblies 101, which may be individually referred to as a first artificial muscle assembly and a second artificial muscle assembly, may include at least one artificial muscle 100. The artificial muscles 100 or artificial muscle assemblies 101 in the pillow body 32 may be secured within the pillow body 32 using any suitable means such as sewing, an adhesive, or the like. Thus, once the artificial muscles 100 are positioned therein, movement of the artificial muscles 100 relative to the pillow body 32 is limited.

As shown in FIGS. 2 and 3, each side portion 48, 50 may include a plurality of artificial muscles 100 arranged in any suitable configuration, such as a stacked arrangement, a zigzag configuration, or the like. In some embodiments, the artificial muscle assemblies 101 may include a greater number of artificial muscles 100 provided proximate the rear end 40 of the pillow body 32 as opposed to the number of artificial muscles 100 provided proximate the front end 38 of the pillow body 32. The greater number of artificial muscles 100 proximate the rear end 40 of the pillow body 32 as compared to the number of artificial muscles 100 proximate front end 38 of the pillow body 32 provides a height greater at the rear end 40 than at the front end 38. This results in the pillow body 32 tapering inwardly from the rear end 40 toward the front end 38. As shown in FIG. 3, as a non-limiting example, the artificial muscle assembly 101 in the second side portion 50 includes five artificial muscles 100 with three artificial muscles 100 stacked proximate the rear end 40 and two artificial muscles 100 stacked proximate the front end 38 and partially overlapping the artificial muscles 100 proximate the rear end 40 to form a zigzag configuration. However, this specific arrangement is intended to be shown for illustrative purposes only and other configurations are within the scope of the present disclosure. For example, each side portion 48, 50 may include a greater or fewer number of artificial muscles 100 extending between the front surface 42 and the rear surface 44 of the pillow body 32, as well as a greater or fewer number of artificial muscles 100 extending between the rear end 40 and the front end 38 of the pillow body 32.

As discussed in more detail herein, the at least one artificial muscle 100 or the artificial muscle assembly 101 within the first side portion 48 may be actuated independently of the at least one artificial muscle 100 or artificial muscle assembly 101 within the second side portion 50. It should be appreciated that there may be additional artificial muscle assemblies 101 not shown herein that are electrically connected to one another and configured to operate independently of or in combination with any other artificial muscle assembly 101. Doing so allows more and/or different areas of the pillow 20 to be inflated based on the locations of the artificial muscle assemblies 101.

As discussed in more detail herein, each artificial muscle 100 is operable between an actuated state in which the artificial muscle 100 is inflated to increase a height of the respective side portion 48, 50 of the pillow body 32, and a non-actuated state in which the artificial muscle 100 is deflated to decrease a height of the respective side portion 48, 50 of the pillow body 32. As shown in FIG. 2, each of the artificial muscles 100 of the artificial muscle assembly 101 positioned within the first side portion 48 is in the non-actuated state and each of the artificial muscles 100 of the artificial muscle assembly 101 positioned within the second side portion 50 is in the actuated state. Thus, a height of the first side portion 48 extending between the front surface 42 and the rear surface 44 is less than a height of the second side portion 50 extending between the front surface 42 and the rear surface 44. It should be appreciated that, due to the contour of the pillow 20, the head 28 of the user will be positioned or otherwise directed toward the side end 34, 36 of the pillow 20 having a lesser height. Thus, as shown in FIG. 2, the head 28 of the user is directed toward the first side portion 48 including the artificial muscles 100 in the non-actuated state. Alternatively, when the artificial muscles 100 of the artificial muscle assembly 101 in the first side portion 48 are inflated to the actuated state and the artificial muscles 100 of the artificial muscle assembly 101 in the second side portion 50 are deflated to the non-actuated state, the contour of the pillow 20 will cause the head 28 of the user to turn toward the second side end 36 of the pillow 20. As discussed in more detail herein, the pillow 20 may be operated to alternate between inflating the artificial muscles 100 in the first side portion 48 and the artificial muscles 100 in the second side portion 50 to repeatedly reposition the head 28 of the user and prevent the head 28 of the user from maintaining the same position for an excess amount of time.

As disclosed in more detail herein, the pillow 20 includes at least one pressure sensor 52 for detecting a force applied against the pillow 20 and determining a length of time that the force is applied. As shown in FIG. 2, the pillow 20 includes a pair of pressure sensors 52 provided within the pillow body 32 on opposite sides of the center 46 and secured against the front surface 42 of the pillow body 32. In other embodiments, the pillow 20 may include only a single pressure sensor 52 or, alternatively, a plurality of pressure sensors 52 spaced apart from one another proximate both the front surface 42 and the rear surface 44 of the pillow body 32.

Figure 4:
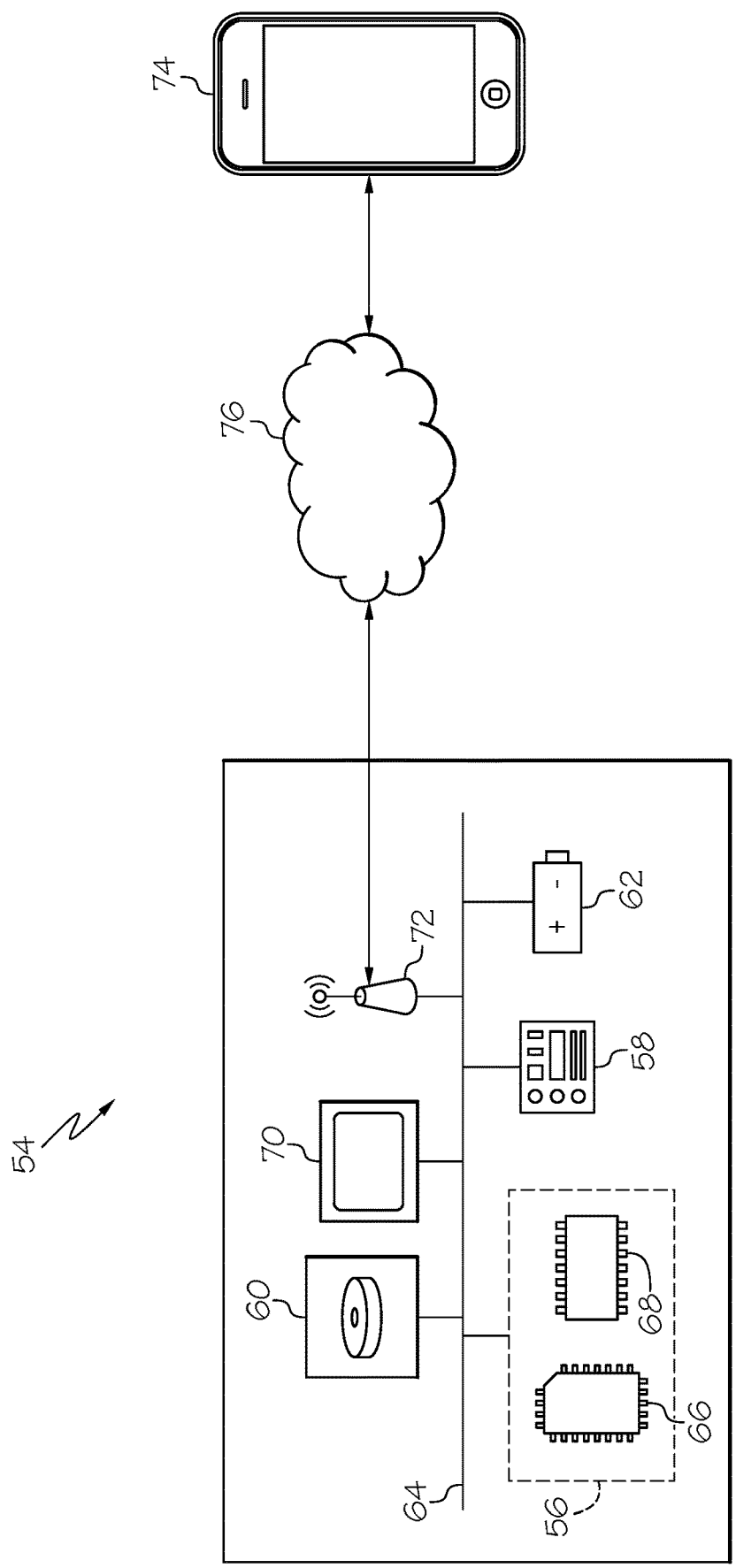
FIG. 4 schematically depicts an actuation system for operating the actuating pillow of FIG. 1, according to one or more embodiments shown and described herein.

Referring now to FIG. 4, an actuation system 54 may be provided for operating the pillow 20 disclosed herein and, more particularly, the artificial muscles 100 of the pillow 20 between the non-actuated state and the actuated state. Thus, the actuation system 54 may include a controller 56, an operating device 58, a head position detector 60, a power supply 62, and a communication path 64. The various components of the actuation system 54 will now be described.

The controller 56 includes a processor 66 and a non-transitory electronic memory 68 to which various components are communicatively coupled. In some embodiments, the processor 66 and the non-transitory electronic memory 68 and/or the other components are included within a single device. In other embodiments, the processor 66 and the non-transitory electronic memory 68 and/or the other components may be distributed among multiple devices that are communicatively coupled. The controller 56 includes non-transitory electronic memory 68 that stores a set of machine-readable instructions. The processor 66 executes the machine-readable instructions stored in the non-transitory electronic memory 68. The non-transitory electronic memory 68 may comprise RAM, ROM, flash memories, hard drives, or any device capable of storing machine-readable instructions such that the machine-readable instructions can be accessed by the processor 66. Accordingly, the actuation system 54 described herein may be implemented in any conventional computer programming language, as pre-programmed hardware elements, or as a combination of hardware and software components. The non-transitory electronic memory 68 may be implemented as one memory module or a plurality of memory modules.

In some embodiments, the non-transitory electronic memory 68 includes instructions for executing the functions of the actuation system 54. As discussed in more detail herein, the instructions may include instructions for operating the artificial muscles 100 based on a detected position of the head 28 of the user determined by the head position detector 60 and a time in which the head 28 of the user remains in a specific position. In addition, the instructions for operating the artificial muscles 100 may be based on a user command, as disclosed herein.

The processor 66 may be any device capable of executing machine-readable instructions. For example, the processor 66 may be an integrated circuit, a microchip, a computer, or any other computing device. The non-transitory electronic memory 68 and the processor 66 are coupled to the communication path 64 that provides signal interconnectivity between various components and/or modules of the actuation system 54. Accordingly, the communication path 64 may communicatively couple any number of processors with one another, and allow the modules coupled to the communication path 64 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 4, the communication path 64 communicatively couples the processor 66 and the non-transitory electronic memory 68 of the controller 56 with a plurality of other components of the actuation system 54. For example, the actuation system 54 depicted in FIG. 4 includes the processor 66 and the non-transitory electronic memory 68 communicatively coupled with the operating device 58, the head position detector 60, and the power supply 62.

The operating device 58 allows for a user to selectively control operation of the artificial muscles 100. In some embodiments, the operating device 58 may be a switch, toggle, button, or any combination of controls to provide user operation to a selected one or series of artificial muscles 100. As a non-limiting example, a user may actuate the artificial muscle 100 into the actuated state by activating controls of the operating device 58 to a first position. While in the first position, the artificial muscle 100 will remain in the actuated state. The user may switch the selected artificial muscle 100 into the non-actuated state by operating the controls of the operating device 58 out of the first position and into a second position. The controls on the operating device 58 may correspond to a specific desired geometry of the pillow 20 by actuating certain artificial muscles 100 when the pillow 20 is in the first position and other artificial muscles 100 when the pillow 20 is in the second position.

The operating device 58 is coupled to the communication path 64 such that the communication path 64 communicatively couples the operating device 58 to other modules of the actuation system 54. The operating device 58 may provide a user interface for receiving user instructions as to a specific operating configuration of the pillow 20. In addition, user instructions may include instructions to automatically operate the pillow 20 and actuate the artificial muscles 100 without user interaction at certain conditions determined by the head position detector 60, as described herein.

The head position detector 60 is communicatively coupled to the controller 56 and includes the pressure sensor 52 discussed herein for detecting a force applied against the pillow 20. Specifically, the head position detector 60 is configured to detect a force to identify a position or location of the head 28 of the user based on the force being applied against the pillow 20. The head position detector 60 may include a single pressure sensor 52 or, alternatively, a plurality of pressure sensors 52 arranged within the pillow body 32 of the pillow 20. By including more than one pressure sensor 52 within the pillow 20, the pressure sensors 52 may be better suited to identify a force applied across the entire pillow 20 as opposed to utilizing only a single pressure sensor 52. The head position detector 60 further includes a timer module for detecting a length of time that a force is applied against the pillow 20. For example, the head position detector 60 may be configured to determine a force being applied against the pillow 20, a length of time that the force is applied, and a change in the force, such as when the head 28 of the user is repositioned on the pillow 20 or entirely lifted off the pillow 20.

To ensure that the timer module is not reset too often, in some embodiments, the timer module is only reset when head position detector 60 determines the change or reduction in force exceeds a reset pressure threshold and/or the length of time which the change of force is experienced exceeds a reset time threshold. In a non-limiting example, the reset pressure threshold for the reduction in force may be 40% to 60% such that the head 28 of the user does not need to be completely removed from the pillow 20 for the timer module to reset. In another non-limiting example, the reset pressure threshold for the reduction in force may be set to 100% so that the timer module is only reset when the head 28 of the user is completely removed from the pillow 20 and no force is detected by the pressure sensor 52. In addition, the reset time threshold for the length of time in which the change of force is experienced may be 0.1 seconds. In another non-limiting example, the reset time threshold for the length of time in which the change of force is experienced may be 0.5 seconds. Requiring a greater reset time threshold prevents minor, quick adjustments in the position of the head 28 of the user from resetting the timer module as opposed to when the reset time threshold is shorter. The reset pressure threshold and the reset time threshold may be set in advance as a default or may be adjusted by the user using the operating device 58.

When the head position detector 60 identifies that the timer module has not been reset for a predetermined length of time, defined by an actuation threshold, the head position detector 60 communicates with the controller 56 to actuate the artificial muscles 100 between the actuated state and the non-actuated state to adjust the position of the head 28 of the user, as discussed herein. For example, when the head position detector 60 determines that the timer module has not been reset for a length of time equal to or greater than the actuation threshold, the head position detector 60 sends a signal to the controller 56, which alternates the actuation state of the at least one artificial muscle 100 within the first side portion 48 and the at least one artificial muscle 100 within the second side portion 50 to position the pillow 20 into a first configuration. The timer is reset once the artificial muscles 100 are actuated. Again, when the head position detector 60 determines that the timer module has not been reset for the a length of time equal to or greater than the actuation threshold, the controller 56 operates in the reverse order to alternate actuation of the at least one artificial muscle 100 within the first side portion 48 and the at least one artificial muscle 100 within the second side portion 50 to position the pillow 20 into a second configuration. It should be appreciated that the above disclosure is equally applicable to embodiments of the pillow 20 including artificial muscles 100 or artificial muscle assemblies 101 at locations of the pillow 20 other than the first side portion 48 and the second side portion 50 such that the pillow 20 can assume different configurations or more than two different configurations. In some embodiments, only some of the artificial muscles 100 are actuated each time the actuation threshold is met to provide additional configurations for the pillow 20. For example, certain artificial muscles 100 may stay in the actuated state or the non-actuated state in multiple configurations.

By alternatively actuating the artificial muscles 100, the head 28 of the user will be repeatedly redirected between the first side portion 48 and the second side portion 50, thereby preventing the head 28 of the user from maintaining the same position for a period of time longer than the actuation threshold. The actuation threshold may be set in advance as a default or may be adjusted by the user using the operating device 58. The actuation threshold may be set to any desired time such as, for example, 5 minutes, 10 minutes, 20 minutes, etc. It should be appreciated that when the actuation threshold is set for a longer period of time, the controller 56 will actuate the artificial muscles 100 less frequently.

The power supply 62 (e.g., battery) provides power to the artificial muscles 100. In some embodiments, the power supply 62 is a rechargeable direct current power source. It is to be understood that the power supply 62 may be a single power supply or battery for providing power to the artificial muscles 100. A power adapter (not shown) may be provided and electrically coupled via a wiring harness or the like for providing power to the artificial muscles 100 via the power supply 62.

In some embodiments, the actuation system 54 also includes a display device 70. The display device 70 is coupled to the communication path 64 such that the communication path 64 communicatively couples the display device 70 to other modules of the actuation system 54. The display device 70 may output a notification in response to an actuation state of the artificial muscles 100 or indication of a change in the actuation state of the artificial muscles 100. Moreover, the display device 70 may be a touchscreen that, in addition to providing optical information, detects the presence and location of a tactile input upon a surface of or adjacent to the display device 70. Accordingly, the display device 70 may include the operating device 58 and receive mechanical input directly upon the optical output provided by the display device 70.

In some embodiments, the actuation system 54 includes network interface hardware 72 for communicatively coupling the actuation system 54 to a portable device 74 via a network 76. The portable device 74 may include, without limitation, a smartphone, a tablet, a personal media player, or any other electric device that includes wireless communication functionality. It is to be appreciated that, when provided, the portable device 74 may serve to provide user commands to the controller 56, instead of the operating device 58. As such, a user may be able to control or set a program for controlling the artificial muscles 100 without utilizing the controls of the operating device 58. Thus, the artificial muscles 100 may be controlled remotely via the portable device 74 wirelessly communicating with the controller 56 via the network 76.

Figure 5:
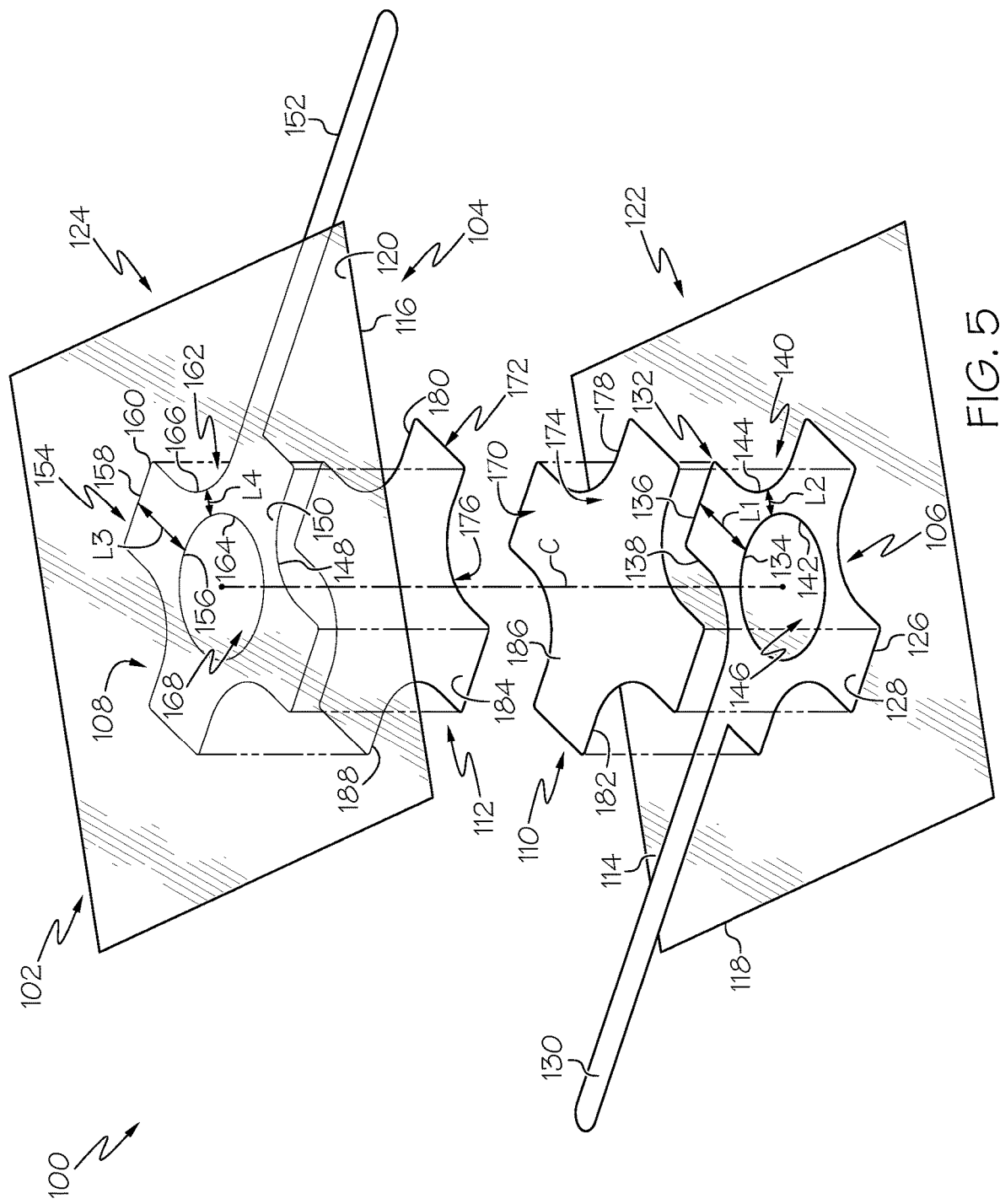
FIG. 5 schematically depicts an exploded view of an illustrative artificial muscle, according to one or more embodiments shown and described herein.
Figure 6:
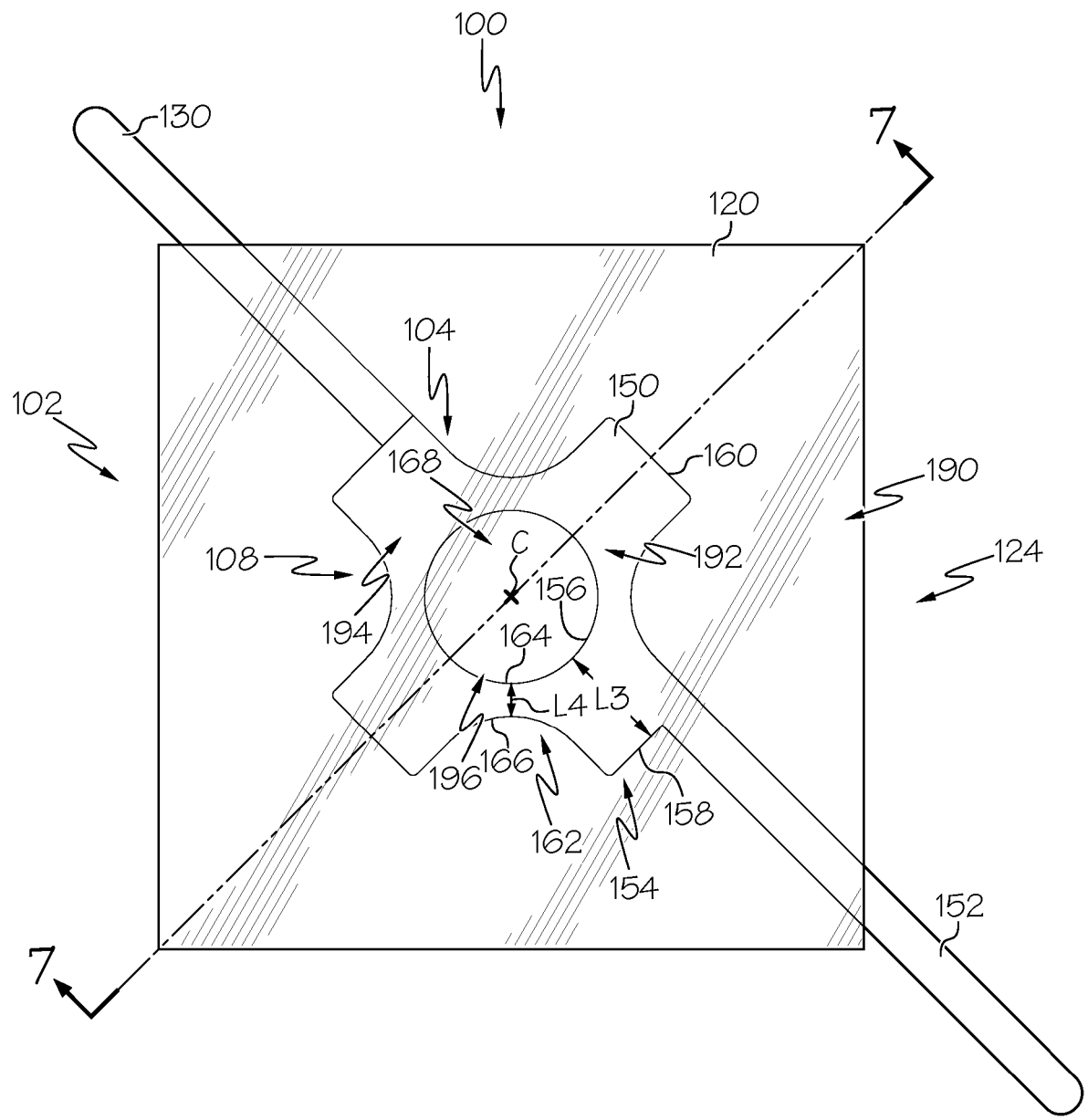
FIG. 6 schematically depicts a top view of the artificial muscle of FIG. 5, according to one or more embodiments shown and described herein.

Referring now to FIGS. 5 and 6, an embodiment of the artificial muscle 100 is shown. However, it should be appreciated that the present disclosure is not limited to the embodiments of the artificial muscle 100 described herein. The artificial muscle 100 includes a housing 102, an electrode pair 104, including a first electrode 106 and a second electrode 108, fixed to opposite surfaces of the housing 102, a first electrical insulator layer 110 fixed to the first electrode 106, and a second electrical insulator layer 112 fixed to the second electrode 108. In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are heat-sealable. In other embodiments, the housing 102 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

Throughout the ensuing description, reference may be made to the housing 102 including the first film layer 122 and the second film layer 124, as opposed to the one-piece housing. It should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to the power supply 62 to actuate the first electrode 106. Specifically, the terminal is coupled, either directly or in series, to the power supply 62 and the controller 56 of the actuation system 54, as shown in FIG. 4. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to the power supply 62 and a controller 56 of the actuation system 54 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 5 and 6, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 5 and 6, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 7:
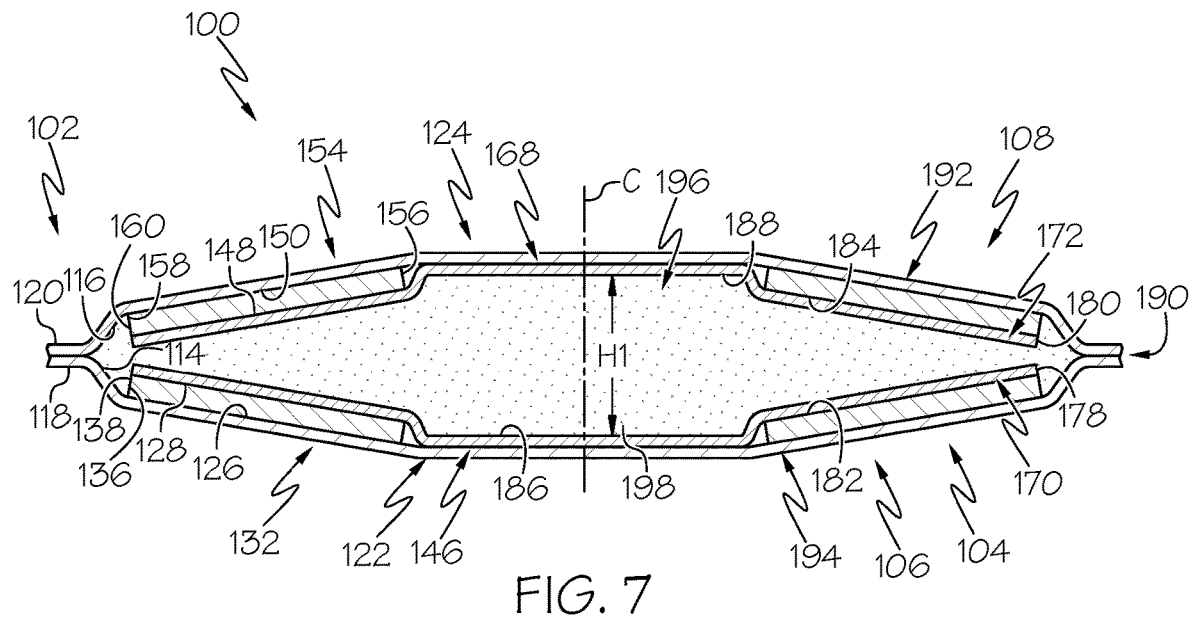
FIG. 7 schematically depicts a cross-sectional view of the artificial muscle of FIG. 5 taken along line 7-7 in FIG. 6 in a non-actuated state, according to one or more embodiments shown and described herein.
Figure 8:
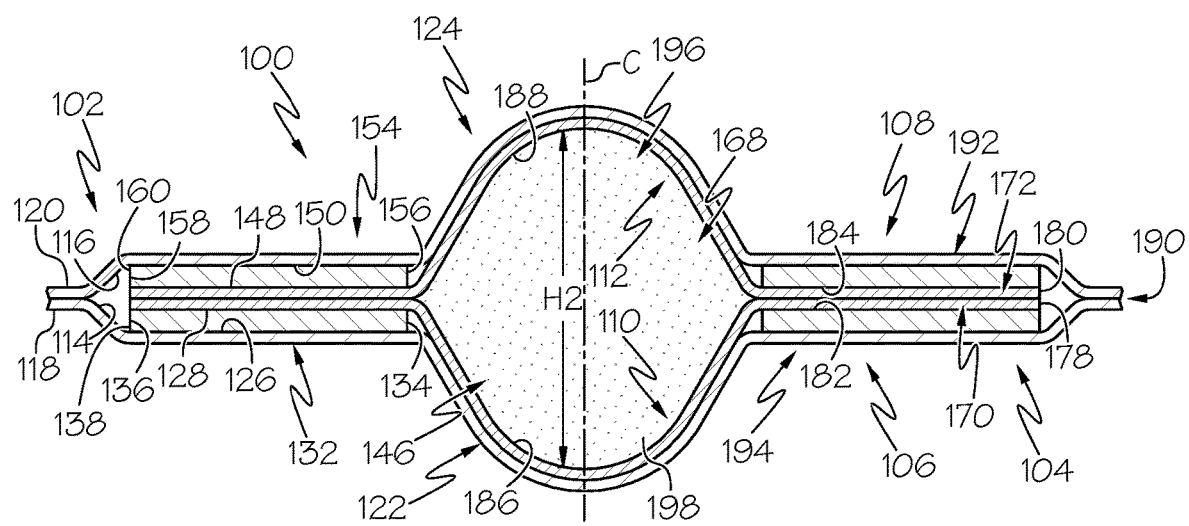
FIG. 8 schematically depicts a cross-sectional view of the artificial muscle of FIG. 7 in an actuated state, according to one or more embodiments shown and described herein.

Referring now to FIGS. 5-8, at least one of the first electrode 106 and the second electrode 108 has a central opening formed therein between the first end 134 of the tab portions 132 and the first end 142 of the bridge portions 140. In FIGS. 7 and 8, the first electrode 106 has a central opening 146. However, it should be understood that the first electrode 106 does not need to include the central opening 146 when a central opening is provided within the second electrode 108, as shown in FIGS. 7 and 8. Alternatively, the second electrode 108 does not need to include the central opening when the central opening 146 is provided within the first electrode 106. Referring still to FIGS. 5-8, the first electrical insulator layer 110 and the second electrical insulator layer 112 have a geometry generally corresponding to the first electrode 106 and the second electrode 108, respectively. Thus, the first electrical insulator layer 110 and the second electrical insulator layer 112 each have tab portions 170, 172 and bridge portions 174, 176 corresponding to like portions on the first electrode 106 and the second electrode 108. Further, the first electrical insulator layer 110 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 110 and the second electrical insulator layer 112 generally include the same structure and composition. As such, in some embodiments, the first electrical insulator layer 110 and the second electrical insulator layer 112 each include an adhesive surface 182, 184 and an opposite non-sealable surface 186, 188, respectively. Thus, in some embodiments, the first electrical insulator layer 110 and the second electrical insulator layer 112 are each a polymer tape adhered to the inner surface 128 of the first electrode 106 and the inner surface 150 of the second electrode 108, respectively.

Referring now to FIGS. 6-8, the artificial muscle 100 is shown in its assembled form with the first terminal 130 of the first electrode 106 and the second terminal 152 of the second electrode 108 extending past an outer perimeter of the housing 102, i.e., the first film layer 122 and the second film layer 124. As shown in FIG. 6, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 110, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 110, and the second electrical insulator layer 112 provide a barrier that prevents the first film layer 122 from sealing to the second film layer 124 forming an unsealed portion 192. The unsealed portion 192 of the housing 102 includes an electrode region 194, in which the electrode pair 104 is provided, and an expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 102 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 7 and 8, the artificial muscle 100 is shown in the non-actuated state and the actuated state, respectively. In the non-actuated state, as shown in FIG. 7, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 102 being sealed at the outer perimeter 138 of the first electrode 106 and the outer perimeter 160 of the second electrode 108. In the actuated state, as shown in FIG. 8, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 7, the artificial muscle 100 is shown in the non-actuated state. The electrode pair 104 is provided within the electrode region 194 of the unsealed portion 192 of the housing 102. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 7, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 8, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by the power supply 62. In some embodiments, a voltage of up to 10 kV may be provided from the power supply 62 to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 110 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments disclosed herein, specifically, the tab portions 132, 154 with the interconnecting bridge portions 174, 176, provide a number of improvements over actuators, such as hydraulically amplified self-healing electrostatic (HASEL) actuators, that do not include the tab portions 132, 154. Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 100 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

Figure 9:
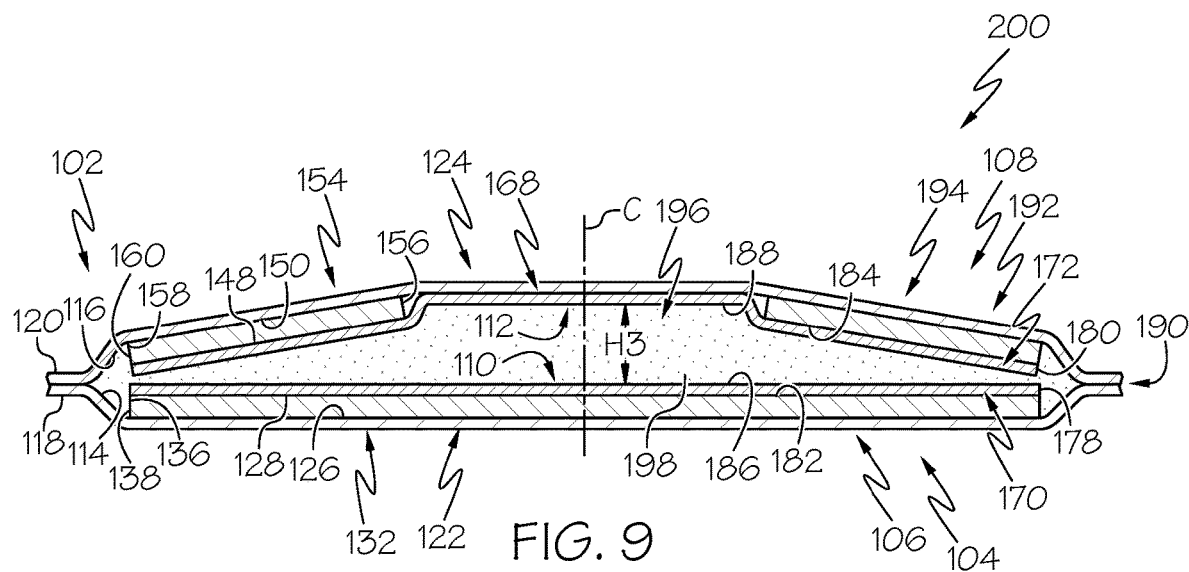
FIG. 9 schematically depicts a cross-sectional view of an illustrative artificial muscle in a non-actuated state, according to one or more embodiments shown and described herein.
Figure 10:
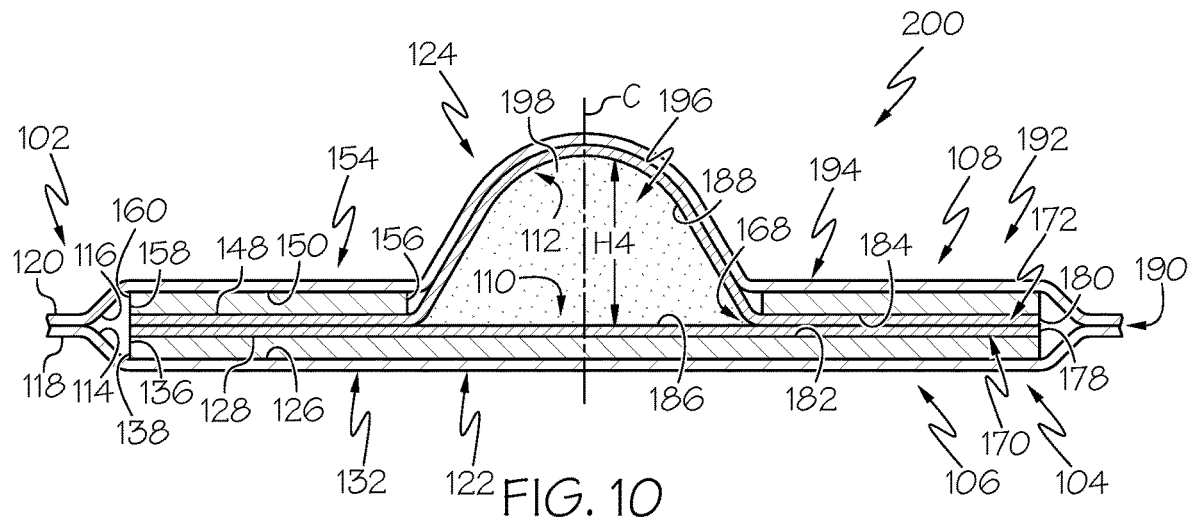
FIG. 10 schematically depicts a cross-sectional view of the artificial muscle of FIG. 9 in an actuated state, according to one or more embodiments shown and described herein.

As shown in FIGS. 9 and 10, another embodiment of an artificial muscle 200 is illustrated. The artificial muscle 200 is substantially similar to the artificial muscle 100. As such, like structure is indicated with like reference numerals. However, as shown, the first electrode 106 does not include a central opening. Thus, only the second electrode 108 includes the central opening 168 formed therein. As shown in FIG. 9, the artificial muscle 200 is in the non-actuated state with the first electrode 106 being planar and the second electrode 108 being convex relative to the first electrode 106. In the non-actuated state, the expandable fluid region 196 has a first height H3. In the actuated state, as shown in FIG. 10, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 200. In addition, because the total deformation is formed on only one side of the artificial muscle 200, the second height H4 of the expandable fluid region 196 of the artificial muscle 200 extends further from a longitudinal axis perpendicular to the central axis C of the artificial muscle 200 than the second height H2 of the expandable fluid region 196 of the artificial muscle 100 when all other dimensions, orientations, and volume of dielectric fluid are the same.

From the above, it is to be appreciated that defined herein are actuating pillows having a plurality of artificial muscles that are actuatable to selectively raise and lower a region of the artificial muscles to provide a selective, on demand inflated expandable fluid region within the actuating pillow to raise and lower a portion of the artificial muscle and, thus, the pillow on demand. This artificial muscle actuation within the actuating pillow operates to selectively reposition the head of a user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An actuating pillow comprising:
   a pillow body;
   a plurality of artificial muscles enclosed within the pillow body in a zigzag configuration, the zigzag configuration defines a first subset of the plurality of artificial muscles provided proximate a front end of the pillow body, and a second subset of the plurality of artificial muscles provided proximate a rear end of the pillow body opposite the front end of the pillow body, the second subset of the plurality of artificial muscles including a greater number of artificial muscles than the first subset of the plurality of artificial muscles, each of the plurality of artificial muscles comprises:
      a housing comprising an electrode region and an adjacent expandable fluid region;
      an electrode pair positioned in the electrode region of the housing; and
      a dielectric fluid housed within the housing,
   wherein the plurality of artificial muscles are configured to actuate from a non-actuated state to an actuated state, actuation from the non-actuated state to the actuated state directs the dielectric fluid into the expandable fluid region and increases a height of the pillow body.

2. The actuating pillow of claim 1, further comprising:
   a processor; and
   a non-transitory computer-readable medium storing computer-readable instructions that, when executed by the processor, causes the processor to:
      determine a position of a force on the pillow body;
      determine a length of time the force is present; and
      when the length of time the force is present exceeds an actuation threshold, actuate the electrode pair of at least one of the plurality of artificial muscles from the non-actuated state to the actuated state, and actuate at least one of the plurality of artificial muscles from the actuated state to the non-actuated state.

3. The actuating pillow of claim 1, wherein the plurality of artificial muscles comprises:
   a first artificial muscle assembly including at least one artificial muscle positioned proximate a first side end of the pillow body; and a second artificial muscle assembly including at least one artificial muscle positioned proximate a second side end of the pillow body opposite the first side end.

4. The actuating pillow of claim 3, wherein the at least one artificial muscle of the first artificial muscle assembly is positioned in a stacked arrangement proximate the first side end of the pillow body and the at least one artificial muscle of the second artificial muscle assembly is positioned in a stacked arrangement proximate the second side end of the pillow body.

5. The actuating pillow of claim 3, wherein the at least one artificial muscle of the first artificial muscle assembly and the at least one artificial muscle of the second artificial muscle assembly alternate between the non-actuated state and the actuated state to alternatively raise and lower the first side end and the second side end of the pillow body relative to one another.

6. The actuating pillow of claim 2, further comprising a head position detector including a pressure sensor provided in the pillow body for determining the position of the force on the pillow body.

7. The actuating pillow of claim 6, wherein the head position detector includes a timer module for determining a length of time the force is present, the timer module is reset when the force is reduced by an amount exceeding a reset pressure threshold and the force is reduced for a length of time exceeding a reset time threshold.

8. The actuating pillow of claim 1, wherein the electrode pair of each artificial muscle comprises:
a first electrode fixed to a first surface of the housing and a second electrode fixed to a second surface of the housing, wherein:
the first electrode and the second electrode each comprises two or more tab portions and two or more bridge portions, wherein:
each bridge portion interconnects adjacent tab portions; and
at least one of the first electrode and the second electrode comprises a central opening positioned between the two or more tab portions and is encircled around the expandable fluid region.

9. The actuating pillow of claim 8, further comprising:
a first electrical insulator layer fixed to an inner surface of the first electrode opposite the first surface of the housing; and
a second electrical insulator layer fixed to an inner surface of the second electrode opposite the second surface of the housing,
wherein the first electrical insulator layer and the second electrical insulator layer each includes an adhesive surface and an opposite non-sealable surface.

10. The actuating pillow of claim 8, wherein the first electrode and the second electrode each includes two pairs of tab portions and two pairs of bridge portions, each bridge portion interconnecting adjacent a pair of adjacent tab portions, each tab portion diametrically opposing an opposite tab portion.

11. The actuating pillow of claim 8, wherein each tab portion has a tab length and each bridge portion has a bridge length extending radially from the central opening, the bridge length being 20% to 50% of the tab length.

12. A vehicle seat system comprising:
a vehicle seat including a head portion having a forward-facing surface;
a pillow body coupled to the forward-facing surface of the head portion of the vehicle seat;
a plurality of artificial muscles enclosed within the pillow body in a zigzag configuration, the zigzag configuration defines a first subset of the plurality of artificial muscles provided proximate a front end of the pillow body, and a second subset of the plurality of artificial muscles provided proximate a rear end of the pillow body opposite the front end of the pillow body, the second subset of the plurality of artificial muscles including a greater number of artificial muscles than the first subset of the plurality of artificial muscles, each of the plurality of artificial muscles comprises:
a housing comprising an electrode region and an adjacent expandable fluid region;
an electrode pair positioned in the electrode region of the housing; and
a dielectric fluid housed within the housing,
a processor; and
a non-transitory computer-readable medium storing computer-readable instructions that, when executed by the processor, causes the processor to:
determine a position of a force on the pillow body;
determine a length of time the force is present; and
when the length of time the force is present exceeds an actuation threshold, actuate the electrode pair of at least one of the plurality of artificial muscles from a non-actuated state to an actuated state, and actuate at least one of the plurality of artificial muscles from the actuated state to the non-actuated state, actuation from the non-actuated state to the actuated state directs the dielectric fluid into the expandable fluid region and increases a height of the pillow body.

13. The vehicle seat system of claim 12, wherein the plurality of artificial muscles comprises:
a first artificial muscle assembly including at least one artificial muscle positioned proximate a first side end of the pillow body; and
a second artificial muscle assembly including at least one artificial muscle positioned proximate a second side end of the pillow body opposite the first side end.

14. The vehicle seat system of claim 13, wherein the at least one artificial muscle of the first artificial muscle assembly is positioned in a stacked arrangement proximate the first side end of the pillow body and the at least one artificial muscle of the second artificial muscle assembly is positioned in a stacked arrangement proximate the second side end of the pillow body.

15. The vehicle seat system of claim 13, wherein the at least one artificial muscle of the first artificial muscle assembly and the at least one artificial muscle of the second artificial muscle assembly alternate between the non-actuated state and the actuated state to alternatively raise and lower the first side end and the second side end of the pillow body relative to one another.

16. The vehicle seat system of claim 12, further comprises a head position detector including a pressure sensor provided in the pillow body for determining the position of the force on the pillow body.

17. A method for actuating an actuating pillow, the method comprising:
generating a voltage using a power supply electrically coupled to an actuating pillow, the actuating pillow comprising:
a pillow body; and
a plurality of artificial muscles arranged within the pillow body in a zigzag configuration, the zigzag configuration defines a first subset of the plurality of artificial muscles provided proximate a front end of the pillow body, and a second subset of the plurality of artificial muscles provided proximate a rear end of the pillow body opposite the front end of the pillow body, the second subset of the plurality of artificial muscles including a greater number of artificial muscles than the first subset of the plurality of artificial muscles, each of the plurality of artificial muscles comprises:

a housing comprising an electrode region and an adjacent expandable fluid region;

an electrode pair positioned in the electrode region of the housing; and a dielectric fluid housed within the housing, wherein actuating the electrode pair of the plurality of artificial muscles from the non-actuated state to the actuated state directs the dielectric fluid into the expandable fluid region of the housing expanding the expandable fluid region and increases a height of the pillow body.

18. The method for actuating an actuating pillow of claim 17, further comprising:

positioning a first artificial muscle assembly including at least one artificial muscle proximate a first side end of the pillow body; and positioning a second artificial muscle assembly including at least one artificial muscle proximate a second side end of the pillow body opposite the first side end.

19. The method for actuating an actuating pillow of claim 18, further comprising:

positioning the at least one artificial muscle of the first artificial muscle assembly in a stacked arrangement proximate the first side end of the pillow body; and positioning the at least one artificial muscle of the second artificial muscle assembly in a stacked arrangement proximate the second side end of the pillow body.

20. The method for actuating an actuating pillow of claim 19, wherein the first side end of the pillow body has a height greater than a height of the second side end of the pillow body when the at least one artificial muscle of the first artificial muscle assembly is in the actuated state and the at least one artificial muscle of the second artificial muscle assembly is in the non-actuated state.

* * * * *

UNITED STATES PATENT AND TRADEMARK OFFICE
CERTIFICATE OF CORRECTION

| | | |
|---|---|---|
| PATENT NO. | : 11,370,340 B2 | Page 1 of 1 |
| APPLICATION NO. | : 16/931569 | |
| DATED | : June 28, 2022 | |
| INVENTOR(S) | : Michael P. Rowe and Ryohei Tsuruta | |

It is certified that error appears in the above-identified patent and that said Letters Patent is hereby corrected as shown below:

On the Title Page

Item (71), applicant, city, delete "Piano" and insert --Plano--, therefor.

Signed and Sealed this
Third Day of September, 2024

Katherine Kelly Vidal
*Director of the United States Patent and Trademark Office*